UNITED STATES PATENT OFFICE.

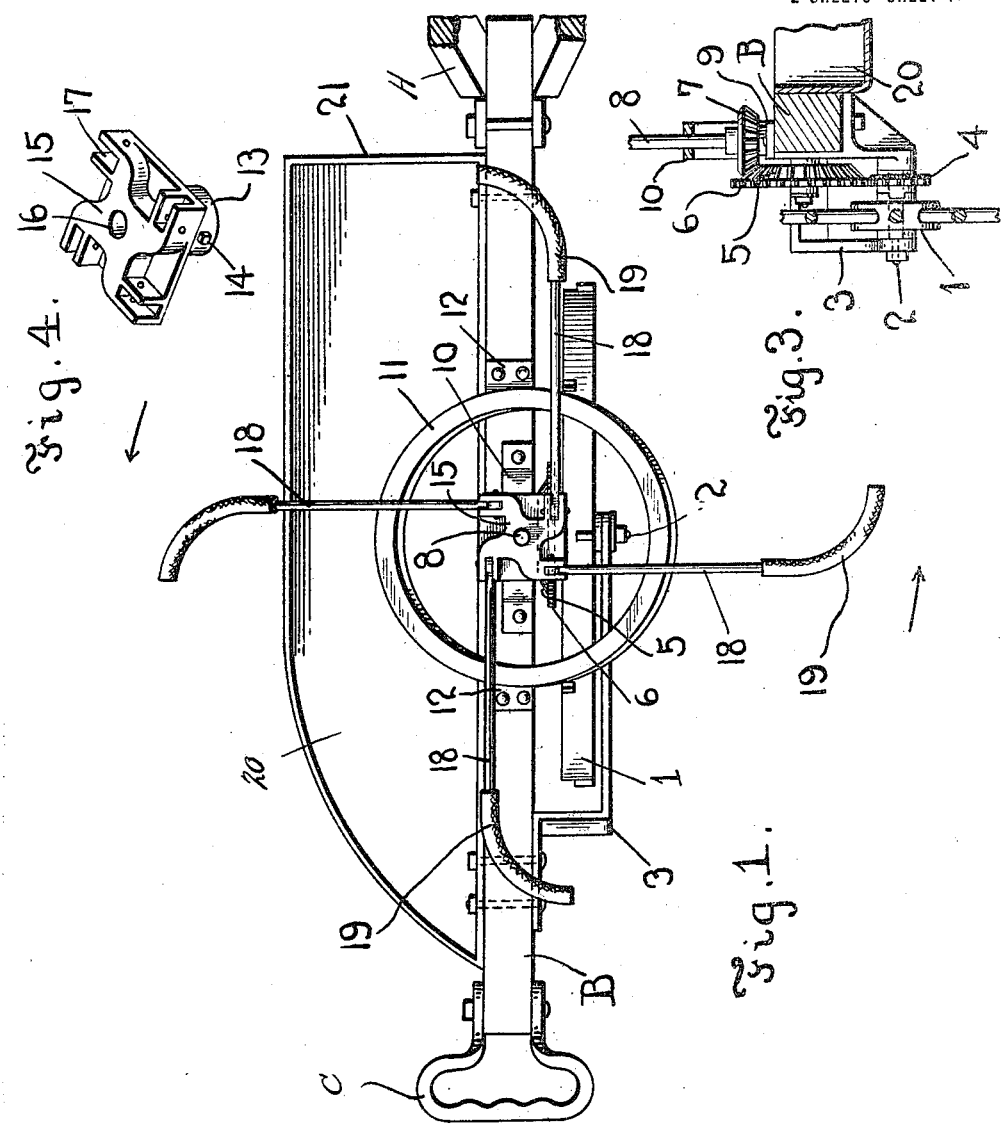

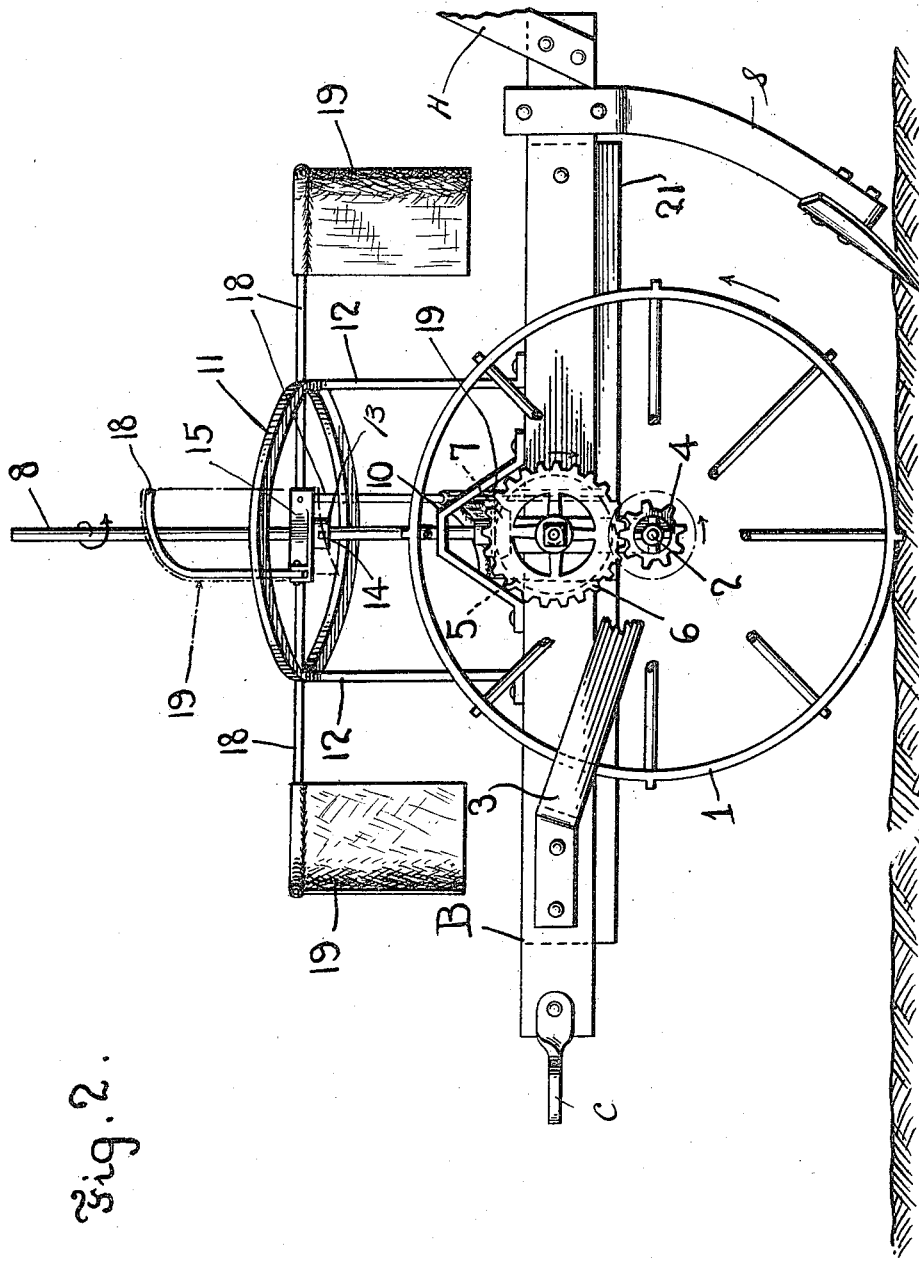

LUTHER D. GRIFFIN, ALBERT J. STEWART, AND GRATTON W. STEWART, OF BLOCTON, ALABAMA.

INSECT-CATCHER.

1,256,552.  Specification of Letters Patent.  Patented Feb. 19, 1918.

Application filed May 22, 1917. Serial No. 170,320.

*To all whom it may concern:*

Be it known that we, LUTHER D. GRIFFIN, ALBERT J. STEWART, and GRATTON W. STEWART, citizens of the United States, residing at Blocton, in the county of Bibb and State of Alabama, have invented certain new and useful Improvements in Insect-Catchers, of which the following is a specification.

This invention relates to improvements in insect catchers, and more particularly to catchers for boll weevil.

The main object of the invention is to provide a simply constructed, strong and efficient machine of this character which while cultivating the plants will simultaneously knock off and collect any insects thereon and retain them, and if necessary kill them at the same time.

Another object is to provide a machine of this character in which the insect catcher apparatus is operated by the travel of the machine over the ground and in which means are provided to adapt the wipers to automatically adjust themselves to operate on plants of varying heights which often occur in the same row.

Still another object is to provide a machine of this character which is especially adapted for use in destroying boll weevil and which will not only collect the insects, but will collect the eggs as well and thus prevent the spread of the pests.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a plow equipped with this improved insect catcher.

Fig. 2 represents a side elevation thereof with parts broken out.

Fig. 3 is a detail transverse section.

Fig. 4 is a detail perspective view of the casting in which the plant engaging blades are mounted.

The insect catcher constituting this invention is shown mounted on an ordinary plow composed of the usual beam B having a depending standard S with a shovel *s* at its lower end. Handles H rise from the rear end of this beam and a clevis C is disposed at the front end thereof for connection with a propelling means which usually is a swingletree to which horses are designed to be hitched.

A supporting and traction wheel 1 is revolubly mounted on an axle 2 supported at one end in a frame 3 which projects laterally from and is secured to the beam B, and at its other end in said beam B. A pinion 4 is carried by the hub of the wheel 1 and meshes with a gear 5 supported on the stub shaft which projects laterally from beam B. This gear 5 has a bevel gear 6 on its inner face which meshes with a coöperating bevel pinion 7 carried by the lower end of a shaft 8 and by means of which said shaft is rotated. This shaft 8, which may be of any suitable or desired height, has one end journaled in a bearing 9 on beam B and extends through a supporting bracket or frame 10, here shown in the form of an inverted truncated V, with the arms thereof secured to the upper face of the beam B, seen clearly in Fig. 2. An annular frame 11 also encircles shaft 8, being carried by suitable uprights 12 fastened to the beam B and which is designed for a purpose to be described, said frame or band 11 being spaced some distance from said shaft as is shown clearly in Fig. 1.

Adjustably mounted on the shaft 8 is a collar 13 having a set screw 14 for holding it in adjusted position on said shaft. A substantially rectangular casting 15 is carried by the upper end of this collar 13 and has a centrally disposed bore 16 communicating with the bore in the collar and through which the shaft 8 is designed to pass. Mounted on the upper face of this casting are a plurality of blade receiving sockets 17, four of which are here shown, one opening from each corner of said plate and in which are pivotally mounted a plurality of blades 18. These blades are here shown constructed of metal rods with their free ends curved laterally and on which ends are mounted depending canvas strips 19 which may be of any suitable or desired size and are designed to form wipers for engaging the plants and knocking the insects therefrom which occurs when the shaft 8 is rotated in the direction of the arrow shown in Fig. 2, the rotation being produced by the passage of the wheel 1 over the earth in the cultivating operation as will be presently more fully described.

An insect receiving receptacle in the form of a pan 20 is shown secured to the side of the beam opposite that on which the wheel 1 is mounted, and which preferably tapers toward its front end as shown at 21, although it need not necessarily be so formed. This pan may be of any desired size or depth and designed to contain oil or any other suitable insecticide, which will destroy the weevils when they drop thereinto.

From the above description it will be understood that when this plow is used for cultivating cotton in the ordinary manner that the wheel 1 passing over the earth will cause shaft 8 to be rotated through the train of gearing above described by means of which the blades 18 carrying the wipers 19 will revolve causing said wipers to contact with the plants being cultivated and knock off any insects which may be contained thereon into the pan 20, where they will be retained and destroyed by the oil or other insecticide contained in the receptacle.

It will be understood that the blades carrying these wipers constitute plant agitators and may be adjusted to position them at any desired height according to the height of the plants to be treated, it being only necessary to disengage the set screw 14 and to adjust collar 13 at the proper height on shaft 8 and then again tighten up the screw.

The band or hoop 11, which operates to lift the arms or wiper blades 18 when passing over the plow beam, when said arms are set for agitating low plants, stands higher on one side than the other as shown in Fig. 2 being tilted at an angle of about 35 degrees.

The high side of the band is shown at the left of the machine and the pivoted arms rest and travel on the upper face of said band and are guided thereby so that the wipers will engage both low and high plants.

This device is designed for use on both sides of a row of cotton and when so used will practically trap all of the insects, those on one side being knocked off by the wipers during the plowing operation on one side of the row and those on the other side when the plow travels down the opposite side of the row.

It is well known that boll weevil is especially injurious to cotton plants owing to the fact that they puncture the squares, which is the technical name for the buds of the plants, and when they puncture these squares, they deposit therein their eggs, which, if allowed to remain, will mature into insects and thereby form additional pests. Hence it is very desirable that in addition to collecting the insects themselves, that these punctured squares be gathered and destroyed so that the eggs contained therein will be harmless, and this is accomplished by collecting the squares. When these squares have been punctured by the insect, they die, and a slight shaking of the plant will cause them to drop off, hence it will be seen that the passage of the wipers 19 over the plants will shake off the punctured squares as well as the insects and direct them into the pan of oil carried at one side of the plow beam.

While this device has been described as especially adapted for use in destroying boll weevil, it is to be understood that it may be used in cultivating and bugging various other plants such as potatoes and the like.

From the foregoing description, taken in connection with the accompanying drawings, the advantages of the construction and of the method of operation will be readily apparent to those skilled in the art to which the invention appertains and while we have described the principle of operation of the invention together with the device which we now consider to be the best embodiment thereof, we desire to have it understood that the device shown is merely illustrative and that such changes may be made as are within the scope of the claimed invention.

We claim:

1. The combination with a plow; of a supporting structure, plant agitators carried by said structure, and controlling means for said agitators to cause them to automatically move in different vertical planes to engage both low and high plants.

2. The combination with a plow, a supporting wheel revolubly mounted thereon, a shaft extending upwardly therefrom, gears arranged between said shaft and wheel whereby the shaft is rotated by the turning of the wheel, a casting adjustably mounted on said shaft and having a plurality of outwardly opening sockets, blades pivotally connected at one end with said sockets and having their free ends curved laterally in the same direction, wipers depending from the curved ends of said blades, and a receptacle carried by said plow for receiving the insects knocked off the plants by said wipers.

3. The combination with a plow having a beam; of a wheel revolubly mounted on said beam, a shaft rising from and supported by said beam and adapted to rotate thereon, a train of gears arranged between said shaft and wheel whereby the shaft is rotated on the turning of the wheel, an annular member surrounding said shaft at a point spaced above its lower end, a plurality of radially extending blades carried by said shaft and having wipers depending therefrom, said blades being pivoted to swing upwardly and adapted to engage said annular member when at their extreme lowermost position on the shaft whereby they are held in inoperative position out of the path of the plants.

4. The combination with a plow of an upstanding shaft, means for rotating said shaft, plant agitators carried by said shaft and controlling means for said agitators to cause them to automatically move in different vertical planes to engage both low and high plants.

5. The combination with a plow of an upstanding shaft, means for rotating said shaft, plant agitators carried by said shaft to turn in a horizontal plane and mounted to move vertically, and means disposed in the path of said agitators to automatically raise and lower them to insure their engagement with both high and low plants.

6. The combination with a plow of an upstanding shaft, means for rotating said shaft, plant agitators carried by said shaft to turn in a horizontal plane and mounted to move vertically, and supporting means for said agitators positioned at an angle to cause them to automatically raise and lower to engage plants of varying heights.

7. The combination with a plow of an upstanding shaft, means for rotating said shaft, plant agitators carried by said shaft to turn in a horizontal plane and mounted to move vertically, and an annular band encircling said shaft and spaced therefrom, said band being inclined from one side of the plow to the other and positioned in and supporting said agitators and over which said agitators travel thereby varying their height to cause them to engage plants of different sizes.

In testimony whereof we affix our signatures in presence of two witnesses.

LUTHER D. GRIFFIN.
ALBERT J. STEWART.
GRATTON W. STEWART.

Witnesses:
  BUD COOK,
  MANDA WOOD.

Copies of this patent may be obtained for five cents each, by addressing the "Commissioner of Patents, Washington, D. C."